US012212461B2

(12) United States Patent
Nissimoff et al.

(10) Patent No.: US 12,212,461 B2
(45) Date of Patent: Jan. 28, 2025

(54) CONFIGURATION CHANGE CONTROL FOR COMPUTING ENVIRONMENTS

(71) Applicant: Microsoft Technology Licensing, LLC, Redmond, WA (US)

(72) Inventors: David Nissimoff, Redmond, WA (US); Romit Chattopadhyay, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/066,279

(22) Filed: Dec. 14, 2022

(65) Prior Publication Data

US 2023/0124985 A1     Apr. 20, 2023

Related U.S. Application Data

(63) Continuation of application No. 16/997,575, filed on Aug. 19, 2020, now Pat. No. 11,558,250, which is a
(Continued)

(51) Int. Cl.
    *H04L 41/082*     (2022.01)
    *H04L 41/08*     (2022.01)

(52) U.S. Cl.
    CPC ........ *H04L 41/082* (2013.01); *H04L 41/0886* (2013.01)

(58) Field of Classification Search
    CPC .......................... H04L 41/082; H04L 41/0886
    See application file for complete search history.

(56) References Cited

U.S. PATENT DOCUMENTS

| 8,311,880 B1 * | 11/2012 | Zabriskie | G06Q 10/06 |
| | | | 705/7.41 |
| 8,417,715 B1 * | 4/2013 | Bruckhaus | G06Q 10/04 |
| | | | 705/26.1 |

(Continued)

FOREIGN PATENT DOCUMENTS

| CN | 107733699 A | 2/2018 |
| CN | 109558150 A | 4/2019 |
| WO | 2004102385 A2 | 11/2004 |

OTHER PUBLICATIONS

Communication pursuant to Article 94(3) received in European Application No. 20751340.9, mailed on Jun. 25, 2024, 7 pages.
(Continued)

*Primary Examiner* — Oanh Duong
(74) *Attorney, Agent, or Firm* — Foley IP Law, PLLC

(57) ABSTRACT

Solutions for balancing speed and risk by managing configuration changes include: receiving a second configuration item for displacement, in an exposure group, of a first configuration item; receiving an exposure state, wherein the exposure state indicates an exposure tree comprising a first configuration item branch and a second configuration item branch; determining, based at least on the exposure state: a first portion of the exposure group to continue with the first configuration item, and a second portion of the exposure group to receive the second configuration item; deploying the second configuration item to the second portion of the exposure group, in accordance with the exposure state; receiving, from the central orchestrator, an updated exposure state; and deploying the second configuration item in accordance with the updated exposure state. In some examples, the exposure tree is a hierarchical binary tree. An exemplary configuration item includes a software application version.

20 Claims, 11 Drawing Sheets

Related U.S. Application Data continuation of application No. 16/525,442, filed on Jul. 29, 2019, now Pat. No. 10,785,106.

(56) References Cited

U.S. PATENT DOCUMENTS

| | | | |
|---|---|---|---|
| 9,311,066 B1* | 4/2016 | Garman | G06F 8/65 |
| 10,785,106 B1* | 9/2020 | Nissimoff | G06F 8/60 |
| 11,762,650 B1* | 9/2023 | Castagna | G06F 21/57 |
| | | | 717/168 |
| 2004/0230547 A1 | 11/2004 | Wookey | |
| 2005/0172280 A1* | 8/2005 | Ziegler | G06F 21/56 |
| | | | 717/174 |
| 2006/0248121 A1 | 11/2006 | Cacenco | |
| 2011/0196775 A1 | 8/2011 | Gavin | |
| 2012/0284710 A1 | 11/2012 | Vinberg | |
| 2016/0216960 A1* | 7/2016 | Garman | H04L 67/34 |
| 2017/0255460 A1* | 9/2017 | Frank | G06F 9/45558 |
| 2017/0262298 A1* | 9/2017 | Frank | G06F 8/65 |
| 2019/0095967 A1* | 3/2019 | Skulnik | H04L 67/02 |

OTHER PUBLICATIONS

First Office Action Received for Chinese Application No. 202080054652.7, mailed on Feb. 1, 2024, 11 pages (English Translation Provided).

Office Action Received for Indian Application No. 202217001767, mailed on Apr. 24, 2024, 8 pages.

Office Action Received for Chinese Application No. 202080054652.7, mailed on Nov. 6, 2024, 4 pages. (English Translation Provided).

* cited by examiner

FIG. 7A

```
{
 "pipelineName": "Deploy to Group2",
 "pipelineDefinitionVersion": "v1",
 "applicationName": "TestApplication",
 "exposureGroup": "Group2",
 "isQfePipeline": false,
 "stages": [
  {
   "region": "western_us",
   "name": "Gradual exposure to western_us",
   "refId": "1",
   "gradualExposure":
    {
     "exposureType": "percentageRampedExposure",
     "exposurePivot": "environmentId",
     "steps": [
      {
       "percentage" : "0",
       "durationToWaitInSeconds": "3600",
       "performMetricAnalysis":true
      },
      {
       "percentage" : "50",
       "durationToWaitInSeconds": "3600",
       "performMetricAnalysis":true
      },
      {
       "percentage" : "100",
       "durationToWaitInSeconds": "3600",
       "performMetricAnalysis":true
      }
     ]
    }
  },
```

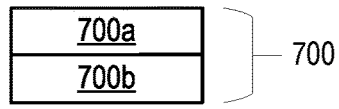

```
{
  "region": "eastern_us",
  "name": "Gradual exposure to eastern_us",
  "refId": "2",
  "gradualExposure":
   {
     "exposureType": "percentageRampedExposure",
     "steps": [
      {
        "percentage" : "0",
        "durationToWaitInSeconds": "3600",
        "performMetricAnalysis":true
      },
      {
        "percentage" : "50",
        "durationToWaitInSeconds": "3600",
        "performMetricAnalysis":true
      },
      {
        "percentage" : "100",
        "durationToWaitInSeconds": "3600",
        "performMetricAnalysis":true
      }
     ]
   }
  }
 ]
}
```

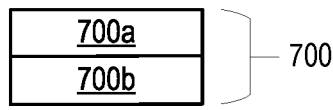

CONFIGURATION CHANGE CONTROL FOR COMPUTING ENVIRONMENTS

CROSS-REFERENCE TO RELATED APPLICATION

This application is a continuation application of and claims priority to U.S. patent application Ser. No. 16/997,575, entitled "CONFIGURATION CHANGE CONTROL FOR COMPUTING ENVIRONMENTS," filed on Aug. 19, 2020, which is a continuation of and claims priority to U.S. patent application Ser. No. 16/525,442 (now U.S. Pat. No. 10,785,106), entitled "CONFIGURATION CHANGE CONTROL FOR COMPUTING ENVIRONMENTS," filed on Jul. 29, 2019, the disclosures of which are incorporated herein by reference in their entireties.

BACKGROUND

Organizations that manage large numbers of computing assets or service large numbers of users, or provide configuration items such as software, data, and models, face a trade-off between roll-out speed for updated (replacement) configuration items and the risk that the updated configuration items contain bugs or other problematic flaws. If a replacement provides poor performance, it is often desirable to limit the exposure. For example, if a new configuration item will cause severe problems for individual users, exposing all users immediately could result in wide-scale outages for some scenarios. Thus, there is a need to balance roll-out speed with risk management. This occurs in multiple settings, including locally-installed software, data sets, and machine learning (ML) models, and also software as a service (SaaS) and platform as a service (PaaS) arrangements.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for managing configuration changes that includes: receiving a second configuration item for displacement, in an exposure group, of a first configuration item; receiving an exposure state, wherein the exposure state indicates an exposure tree comprising a first configuration item branch and a second configuration item branch; determining, for the exposure group, based at least on the exposure state: a first portion of the exposure group to continue with the first configuration item, and a second portion of the exposure group to receive the second configuration item; deploying the second configuration item to the second portion of the exposure group, in accordance with the exposure state; based at least on a first trigger event, receiving, from the central orchestrator, an updated exposure state; and deploying the second configuration item in accordance with the updated exposure state. In some examples, the exposure tree is a hierarchical binary tree. An exemplary configuration item includes a software application version.

BRIEF DESCRIPTION OF THE DRAWINGS

The disclosed examples are described in detail below with reference to the accompanying drawing figures listed below:

FIGS. 7A and 7B show pseudocode in an exemplary file for management of configuration changes, as performed by the arrangement of FIG. 1;

Corresponding reference characters indicate corresponding parts throughout the drawings.

DETAILED DESCRIPTION

Figure 1:
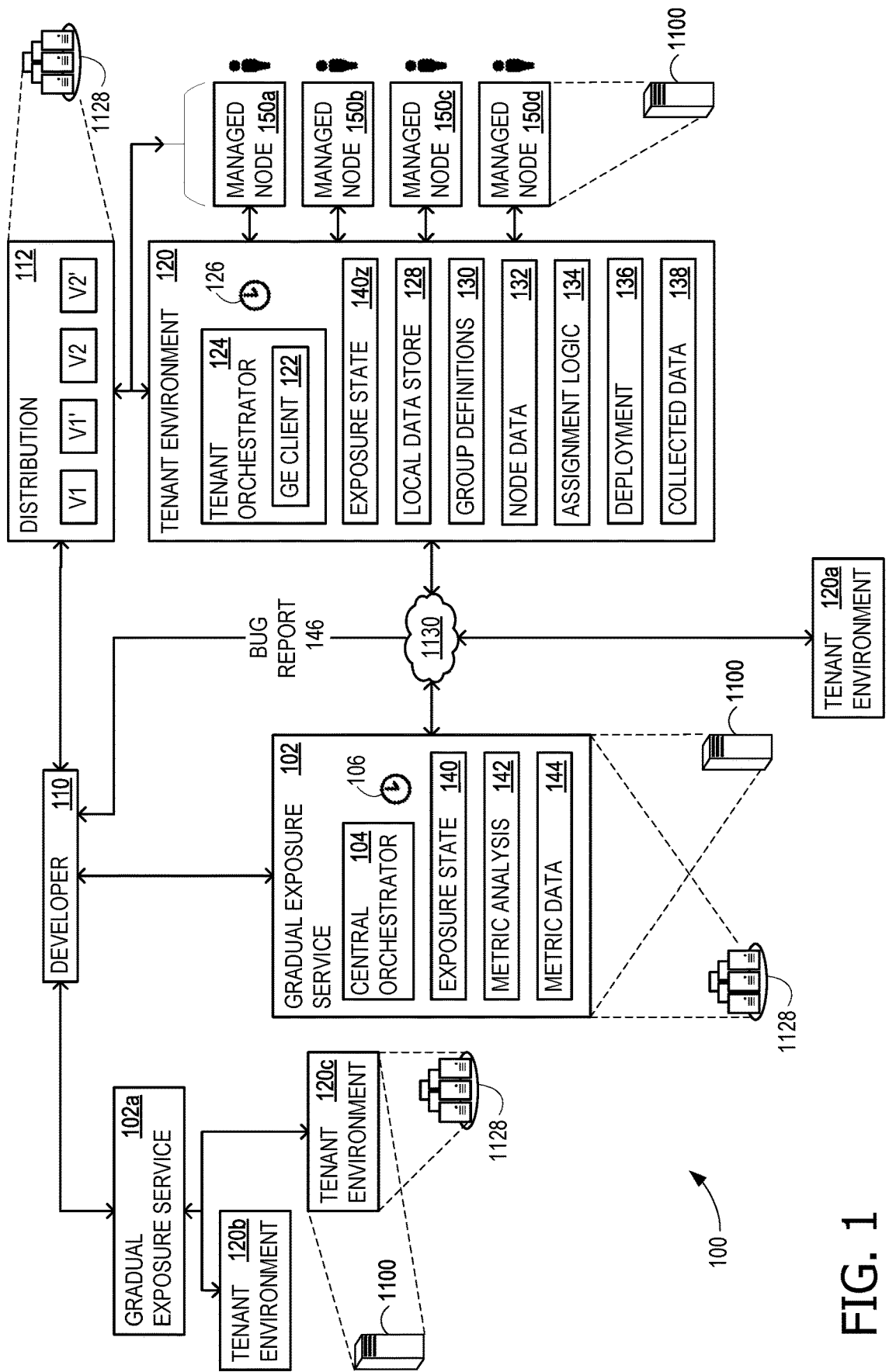
FIG. 1 illustrates an arrangement that advantageously employs configuration change control for managed nodes (e.g., computing assets)

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions are disclosed for balancing roll-out speed with risk management when managing configuration changes in multiple settings, such as locally-installed software, data sets, and machine learning (ML) and artificial intelligence (AL) models (collectively, ML models), and also software as a service (SaaS) and platform as a service (PaaS) arrangements. Aspects of the disclosure include: receiving a second configuration item for displacement, in an exposure group, of a first configuration item; receiving an exposure state, wherein the exposure state indicates an exposure tree comprising a first configuration item branch and a second configuration item branch; determining, for the exposure group, based at least on the exposure state: a first portion of the exposure group to continue with the first configuration item, and a second portion of the exposure group to receive the second configuration item; deploying the second configuration item to the second portion of the exposure group, in accordance with the exposure state; based at least on a first trigger event, receiving, from the central orchestrator, an updated exposure state; and deploying the second configuration item in accordance with the updated exposure state. In some examples, the exposure tree is a hierarchical binary tree.

Aspects of the disclosure operate in an unconventional way to improve configuration change control by gradually exposing a change (configuration change, code update, etc.) to an exposure group in a sequence of stages, in which the exposure is abstracted as a tree with differing branches deploying (or sustaining) a first configuration item or a second (replacement) configuration item that will eventually fully displace the first configuration item. That is, the roll-out produces a gradual exposure within an exposure group, to minimize risk introduced by the second (replacement) configuration item. In some examples, individual tenants can tailor the roll-out speed seen by their managed nodes (e.g., users' computing assets). Thus, in an exemplary scenario in which a newer software application version is to displace a prior version, some nodes within an exposure group continue with the prior version, while a growing percentage of the nodes receives the newer version. In some examples, when a bug is discovered in either the prior version or the newer version, requiring quick-fix engineering (QFE), the QFE version is also distributed in a second hierarchical tier of the relevant branch until the QFE version displaces the version with the bug within that branch.

Aspects of the disclosure can be generalized to other configuration management tasks for various large scale operations of managed nodes, such as managed computing assets. In addition to software, other configuration items can also be managed according to the disclosure herein, including data sets, data formatting and arrangements, documentation, ML models, hardware, storage and other managed assets. Aspects of the disclosure limit the blast radius of changes in order to intelligently manage risk. A bake time, between increases in deployments of the replacement configuration item, permits bug reports to be returned to the developer, so that the bugs can be fixed mid-roll-out.

FIG. 1 illustrates an arrangement 100 that advantageously employs configuration change control for managed nodes (e.g., computing assets), for example managed nodes 150a-150d and others. In some examples, managed nodes 150a-150d represent physical assets. In some examples, managed nodes 150a-150d represent non-tangible assets such as a user account, user session, or group of users (e.g., so the configuration is specific to a user, session, or group, and is independent of the particular physical computing device being operated). In some examples, managed nodes 150a-150d represent users, user groups, and/or sessions in a SaaS environment, rather than physical hardware devices. Arrangement 100 includes a gradual exposure service 102 that services a tenant environment 120 and another tenant environment 120a. Another gradual exposure service 102a handles (services) tenant environment 120b and 120c. Gradual exposure services 102 and 102a operate similarly, as do tenant environments 120-120c (which manages other managed nodes not shown). In some examples, operations described for gradual exposure service 102 are performed by a computing device 1100 of FIG. 11, either alone or as part of a cloud resource 1128 (also of FIG. 9). In some examples, operations described for tenant environment 120 are performed by a computing device 1100, either alone or as part of a cloud resource 1128. In some examples, managed nodes 150a-150d each comprises a computing device 1100. In some examples, tenant environments 120-120c poll a local (or otherwise assigned) gradual exposure service, such as one of gradual exposure services 102 and 102a. It should be understood that a different number and arrangement of gradual exposure services and tenant environments may be used in differing versions of arrangement 100.

A developer 110 generates configuration items, shown as V1, V1' (V1 prime), V2, and V2' (V2 prime) within a distribution node 112. In some examples, the configuration items each comprises a software application version. In some examples, the configuration items include data sets, ML models, and/or other items for which configuration is managed. In the illustrated example of FIG. 1, configuration item V2 is scheduled to displace configuration item V1. In some examples, distribution node 112 is not a separate node (e.g., a cloud resource 1128), but is instead located within one or more of developer 110, gradual exposure service 102, and tenant environment 120.

Gradual exposure service 102 includes a central orchestrator 104 that provides a current exposure state 140 to tenant environment 120. Based at least upon a trigger event, such as a signal from a timer 106 or a message from developer 110 that a new configuration item is available within distribution node 112, central orchestrator 104 updates exposure state 140. An exposure state (e.g., exposure state 140) indicates a first configuration item branch and a second configuration item branch. In some examples, exposure state 140 indicates a binary tree comprising branches indicating either: a first set comprising a configuration item and a null placeholder; or a second set comprising a first configuration item branch weight and a second configuration item branch weight. Additional detail regarding exposure states is provided with respect to FIGS. 3-6.

A tenant orchestrator 124 within tenant environment 120 polls gradual exposure service 102 (for example, central orchestrator 104 within gradual exposure service 102) for the current exposure state, and receives exposure state 140 to replace the prior exposure state 140z. Thus, exposure state 140 is an updated exposure state relative to exposure state 140z. At a later time, a newer exposure state will become an updated exposure state relative to exposure state 140. In some examples, tenant orchestrator 124 polls central orchestrator 104 in response to a trigger event, such as a signal from a timer 126 or a message from that a new configuration item is available within distribution node 112. In some examples, a gradual exposure client (GE client) 122 within tenant orchestrator 124 manages communication with gradual exposure service 102, for example, with central orchestrator 104. In some examples, GE client 122 is a distributed component that runs on multiple different computing devices. In some examples, multiple instances of GE client 122 operate based on the latest exposure state 140 acquired from gradual exposure service 102 and, having that latest state, each GE client 122 is able to function "offline" (e.g., between communication events with gradual exposure service 102) to make local determinations and branch assignments, as necessary. Thus, even if gradual exposure service 102 becomes unavailable, instances of GE client 122 remain operational without degradation, other than losing the ability to timely update to a more recent exposure state.

Some examples of tenant environment 120 also include a local data store 128 that stores local copies of configuration items V1, V1', V2, and V2' for deployment to managed nodes 150a-150d. In some examples, deployment includes installation of a software application package that involves multiple steps and processing on managed nodes 150a-150d. In some examples, deployment is a simpler procedure, such as distribution. In some examples, tenant orchestrator 124 within tenant environment 120 informs a managed node (e.g., one of managed nodes 150a-150d) which version has been assigned (see FIG. 8), and the managed node obtains the assigned configuration item (e.g., one of V1, V1', V2, and V2') from distribution node 112. In some examples, deployment is a simpler procedure, such as storing, in memory within a computing device (e.g., one of managed nodes 150a-150d) the computed configuration value based on current exposure state 140 for the current exposure group. Once in memory, the computed configuration value can then be used by other pieces of software running on the same machine to affect its behavior. One example of such use is "Feature Flags" or "Feature Control Bits" (FCBs), which are used as control indications for the functionality of a SaaS application, and which can be dynamically turned on or off as orchestrated through gradual exposure service 102.

Figure 2:
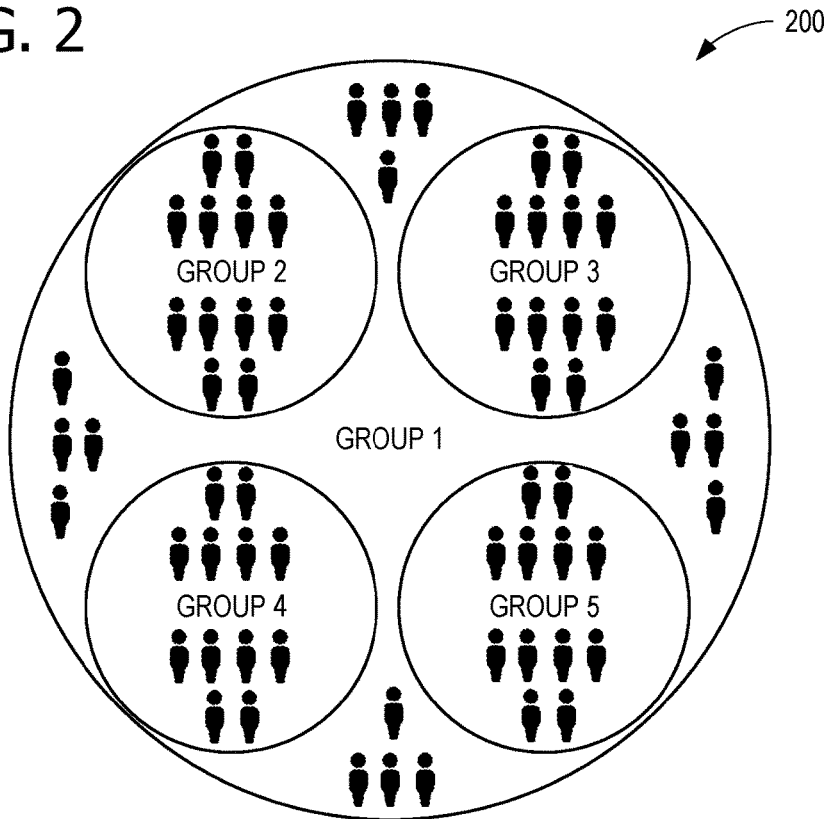
FIG. 2 illustrates an exemplary set of exposure groups.

When one of managed nodes 150a-150d communicates with tenant orchestrator 124 regarding a configuration action (e.g., requesting installation of the assigned software version), tenant orchestrator 124 is able to uniquely identify the specific managed node (e.g., managed node 150a), using group definitions 130 and node data 132. In some examples, node data 132 is a physical file with persistence. In some examples however, node data 132 is ephemeral and only exists, for example, for the duration of an incoming HTTP request that is processed on some computing device. In such examples, node data 132 is dynamically extracted from the contents of the incoming HTTP request and cease to exist thereafter. In some examples, tenant environment 120 manages multiple exposure groups. Turning briefly to FIG. 2, an exemplary set 200 of exposure groups is illustrated. These exposure groups represent sets of managed nodes and include a superset Group 1, and individual groups within Group 1: Group 2, Group 3, Group 4, and Group 5. The different groups can represent nodes located within different geographical regions, computing assets assigned to different classes of users (e.g., administrative staff, operations, sales, and engineering), or some other grouping criteria. The roll-out procedures described herein can be applied globally to Group 1 (which includes Groups 2-5), or independently at different rates within each of Groups 2-5.

Assignment logic 134 performs the actual assignment of the first or second configuration item to each of managed nodes 150a-150d, based at least on data associated with each of managed nodes 150a-150d. Node data 132 includes identification of information that is specific to one of managed nodes 150a-150d, such as a processor serial number or an assigned name or identification number. Because some instances of exposure state 140 includes branch weights that indicate which portion of managed nodes (that are managed by tenant environment 120) are to receive the first configuration item branch weight versus the second configuration item, the branch weights can be used as a percentage. One solution to assigning the various managed nodes to one branch or the other is to apply a deterministic mathematical hashing function to the data from node data 132 that is specific to a particular managed node (e.g., managed node 150a), and compare the hash value with a threshold. A deterministic operation (e.g., a hash value) is performed on data associated with each member of the exposure group (e.g., data from node data 132) to generate a member value. In some examples, additional data that can change with exposure state, is combined with the data associated with each member of the exposure group, so that the assignment is pseudo-random (e.g., appearing random, but being based on a deterministic process). In some examples, the member value is scaled (or the threshold is scaled) so that the threshold falls within the range of possible member values, at a location within that range, so that a uniform probability distribution of possible member values produces a percentage of assignments approximately equal to the respective branch weights.

As a more specific example, the branch weights are 50% for each branch. Data associated with managed node 150a is combined with a timestamp of the roll-out kick-off (or some other suitable data), and this combination is hashed. The hash function produces a set of bytes, and the first byte range from 00 to hexadecimal FF (which corresponds to a decimal value of 256). Because the range is 0-256, a threshold is set at 128 (which is 50% of 256). If the first byte of the hash value is below 128 (in decimal value), the managed node is assigned the first configuration item. If, however, the first byte of the hash value is 128 (in decimal value) or higher, the managed node is assigned the second configuration item. For different branch weights, different thresholds can be set. In some examples, the range of member values is known to not be uniform, so the threshold is set based on a more complex formula. As long as the expected probability distribution of the member values is known, a threshold can be determined. Some examples use a different assignment process. In some examples, the logic required for the assignment process, such as the hash function and threshold setting operation, are within assignment logic 134.

In some examples, a deployment component 136 deploys the configuration items in accordance with the assignment from assignment logic 134, which is in turn assigned in accordance with exposure state 140. In some examples, the managed nodes 150a-150d receive their assignments from tenant orchestrator 124 and handle the deployments themselves. In some examples, the assignments have the property of being monotonic, meaning that as the exposure percentage increases (e.g. goes from zero to 100), a node assignment can only go from V1 to V2 or stay at V2 throughout, and does not go backward. Similarly, as the exposure percentage decreases (e.g. rolled back from 100 to zero), a node assignment can change from V2 to V1 or stay at V1 throughout, but not the other way.

During the roll-out, issues may arise that require correction. For example, a bug might be discovered in configuration item V1 or V2. To facilitate needed corrective measures, collected data 138 stores data related to the performance of configuration items V1 and V2 during the roll-out. In some examples, collected data 138 is forwarded to gradual exposure service 102 for processing by a metric analysis component 142 to produce metric data 144. Bug reports 146 and metric data 144 are forwarded to developer 110 for determination whether a corrective action, such as QFE, a hot-fix, a patch, or a rollback is warranted. Other possible corrective actions include: a fast forward (FF) and a halt. If a problem exists in configuration item V1 but not configuration item V2, an FF corrective action resolves the issue by speeding up the rollout of configuration item V2 so that nodes/users cease using configuration item V1 sooner. In some scenarios, an FF corrective action solves any problems more quickly than a QFE or patch. A halt is used to prevent additional nodes/users from receiving configuration item V2 while the developer analyzes the situation and determines the best course of action.

If a problem is reported with configuration item V1, then the QFE is configuration item V1', whereas if a problem is reported with configuration item V2, then the QFE is configuration item V2'. The deployment of configuration item V1' and/or configuration item V2' concurrently with configuration items V1 and V2 is described in relation to FIGS. 5 and 6. Various trigger events are used for updating exposure stares, including a new release or kickoff by developer 110, a bake time reaching a timer event (for one of timers 106 and 126), or metric data 144 meeting certain criteria.

Figure 3:
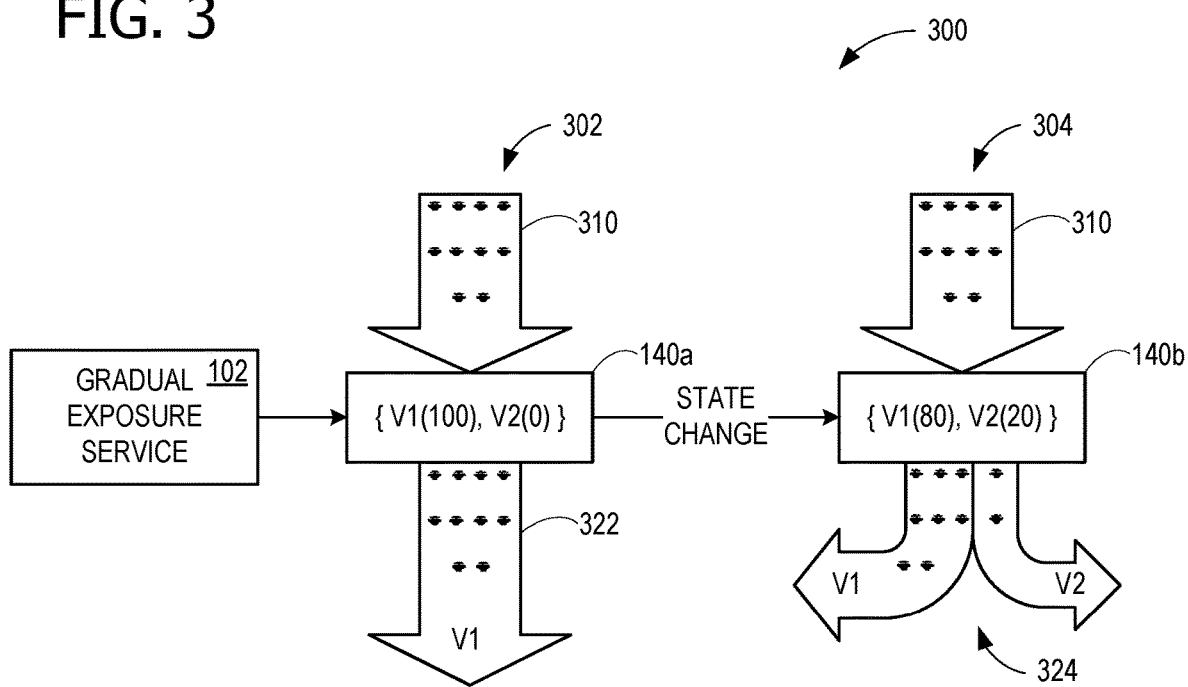
FIG. 3 illustrates exemplary stages of a traffic shifting operation performed by the arrangement of FIG. 1 for a representative group of FIG. 2.

FIG. 3 illustrates exemplary stages 302 and 304 of a traffic shifting operation 300 performed by arrangement 100 for a representative group, such as Group 2 of FIG. 2. At stage 302, gradual exposure service 102 has provided a first exposure state 140a that has a first configuration item branch weight of 100 for a first configuration item V1 and a second configuration item branch weight of 0 (zero) for a second configuration item V2. A dynamic open set 310 of managed nodes is to be configured as requests arrive. In some examples, incoming requests are not the only trigger for the branch assignment. In some examples, HTTP requests or other push models act as triggers. Some examples use pull requests in a pull model implementation (e.g., reading entries from a file and processing each one individually) for triggers.

In some examples, the extent of set 310 is not known ahead of time, and set 310 grows in real-time as new users begin using services or new sessions are spawned. In some examples, set 310 is not stored in memory as an identifiable data set, but instead merely represents a notional set of the managed nodes for which assignments have or will be made—even if there has not been an enumeration or recording of the assignments. In some examples, set 310 does not include the entirety of an exposure group, if some managed nodes are not active. Because the branch weighting is {V1(100), V2(0)} at stage 302, all (100 percent) of the managed nodes are assigned V1. The exposure tree 322 does not branch. For stage 304, a state change (state transition) occurs, which steps up V2 to 20 (20%), which is reflected in an updated exposure state 140b. For updated exposure state 140b, at stage 304, the branch weighting is {V1(80), V2(20)}. Thus, 80% of set 310 (a first portion) stays with configuration item V1 and 20% (a second portion) is assigned configuration item V2, as shown in branched exposure tree 324. Branched exposure tree 324 is a binary tree because it has two branches: V1 and V2. In some examples, the extent (or bounds) of dynamic open set 310 and the portions are not known ahead of time, but instead are dynamic as managed nodes require assignment—for example, when new user sessions are spawned. That is, assignment to configuration item V1 or configuration item V2 is dynamic, as incoming requests grow set 310. So, for example, a first set of 100 requests arrive, and set 310 is 100, with branch V1 having 80 and branch V2 having 20. As time passes, additional requests arrive, growing set 310 and thus the portions (branches V1 and V2) grow dynamically.

Each exposure group (e.g., Groups 2-5 of FIG. 2) is associated with an exposure pipeline, which is composed of stages (e.g., stages 302 and 304). Stages can depend on other stages or run concurrently. A stage (or exposure stage) is a unit of execution, and in some examples, is composed of multiple steps. A stage is a logical unit of execution entity with in a pipeline, and steps run serially to complete a stage. During the execution, a pipeline can pass through various stages. Exemplary stages include:
  a) NotStarted: This state occurs when an instance of a pipeline is created, but has not yet started execution.
  b) Running: This state indicates that the pipeline is currently running (executing).
  c) Cancelled: This state indicates that that the pipeline has been cancelled and cannot resume.
  d) Stopped: This state indicates that the pipeline is stopped and none of the stages in the pipeline are being executed.
  e) Error: This state indicates that the pipeline is in an error state and an investigation is warranted.
  f) Completed: This state indicates the completion of the pipeline.

Central orchestrator 104 provides the tempo and control for roll-outs by starting an instance of a pipeline and executes the gradual rollout strategy as indicated by a pipeline template. In some examples, central orchestrator 104 starts a roll-out by creating a dependency graph of stages as indicated by the pipeline template. Central orchestrator 104 then analyzes the steps in a given stage and executes the steps sequentially within a given stage. If a request is provided to central orchestrator 104 to attach a second tier (sub-stage), then if the second tier indicates that the first tier (parent stage) is dependent on the completion of the second tier, orchestrator 104 halts the first tier until the second tier has completed its execution. This scenario is described in relation to FIG. 6 below. Central orchestrator 104 ensure that another instance of the pipeline is not queued unless the pipeline has been set to allow concurrent execution. Central orchestrator 104 ensures in case of parallel pipeline execution, the execution of individual steps of the pipeline remain sequential. Central orchestrator 104 provides the state change (state transition) of individual stages in the pipeline as well as the overall state of the pipeline.

Figure 4:
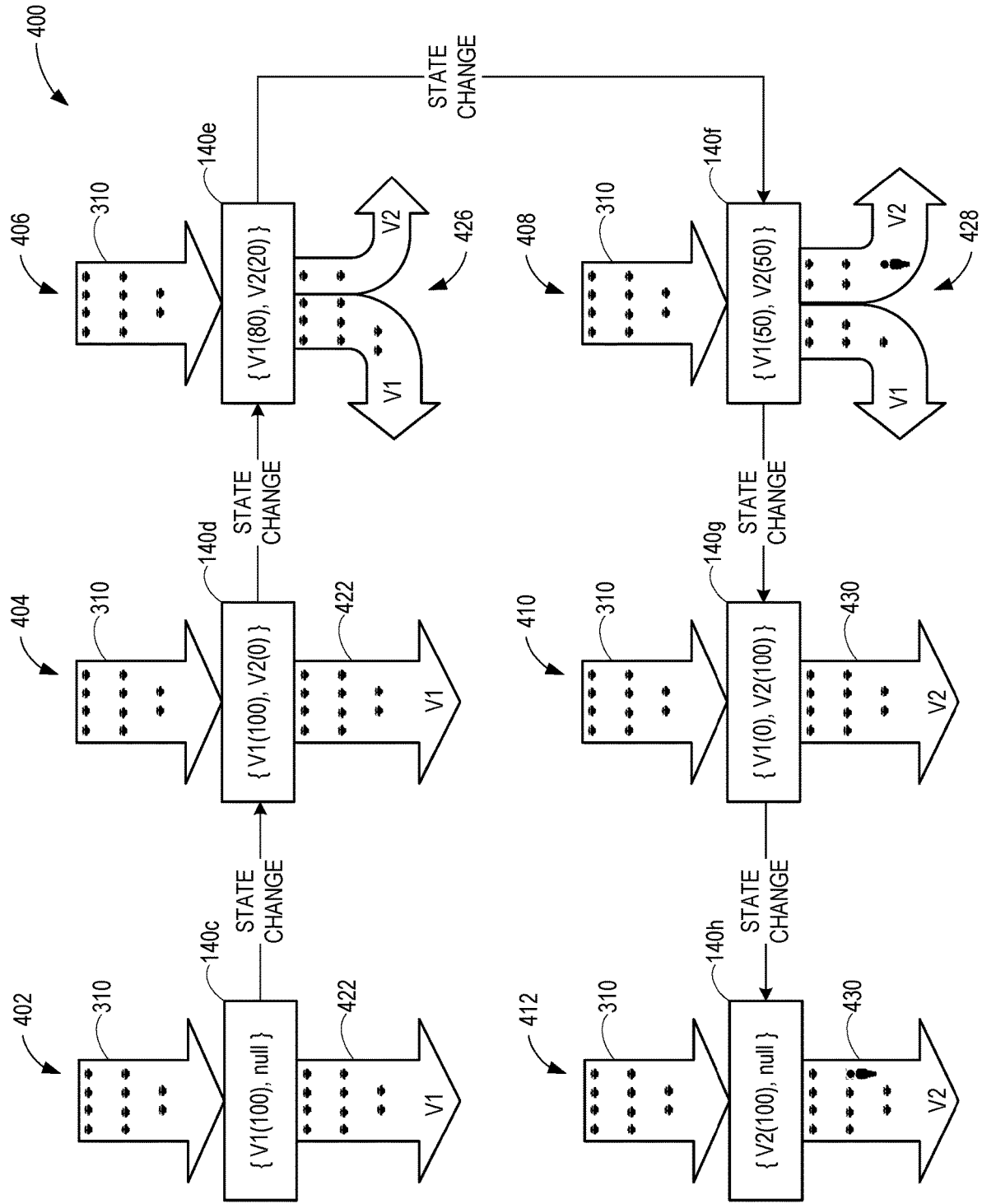
FIG. 4 illustrates exemplary exposure trees at various stages of a configuration item roll-out, as performed by the arrangement of FIG. 1.

FIG. 4 illustrates exemplary exposure trees in pipeline 400 at various stages 402-412 of a configuration item roll-out, as performed by arrangement 100. At stage 402, an initial exposure state 140c indicates branch weighting {V1 (100), null} which is configuration item V1 and a null placeholder. The gives a non-branching exposure tree 422. A state change occurs, to bring pipeline 400 to stage 404 with exposure state 140d indicating branch weighting {V1(100), V2(0)}. This is a first configuration item branch weight of 100 and a second configuration item branch weight of 0 (zero) and still indicates non-branching exposure tree 422. In stages 402 and 404, all (100%) of the managed nodes are receiving (or keeping) configuration item V1.

Another state change occurs, to bring pipeline 400 to stage 406 with exposure state 140e indicating branch weighting {V1(80), V2(20)}. This is a step up for configuration item V2, indicating a first configuration item branch weight of 80 and a second configuration item branch weight of 20. This indicates branching exposure tree 426, in which 80% of the managed nodes (a first portion) are receiving (or keeping) configuration item V1 and configuration item V2 is being deployed to the remaining 20% (a second portion). Another state change steps up configuration item V2 to 50 for stage 408, so that exposure state 140f indicates branch weighting {V1(50), V2(50)}. This results in exposure tree 428 in which configuration item V2 is being deployed to half of the managed nodes. In some examples, the pseudorandom assignment process uses data that preserves the member value, so that for a stable roll-out, if a node had been assigned configuration item V2 at an earlier stage, it will continue to remain with configuration item V2.

Another state change steps up configuration item V2 to 100 for stage 410, so that exposure state 140g indicates branch weighting {V1(0), V2(100)}. This results in non-branching exposure tree 430 in which configuration item V2 is deployed to all of the managed nodes under the management of tenant environment 120. Note that other tenant environments (e.g., tenant environments 120b and 102c of FIG. 1) may have faster or slower roll-outs and so some may still be using configuration item V1. A final state change brings pipeline 400 to stage 412 with exposure state 140h indicating branch weighting {V2(100), null}. Pipeline 400 has now been completed. At this point, configuration item V2 has fully displaced configuration item V1, and now stands to be displaced with a future configuration item, in a repeat of pipeline 400.

Figure 5:
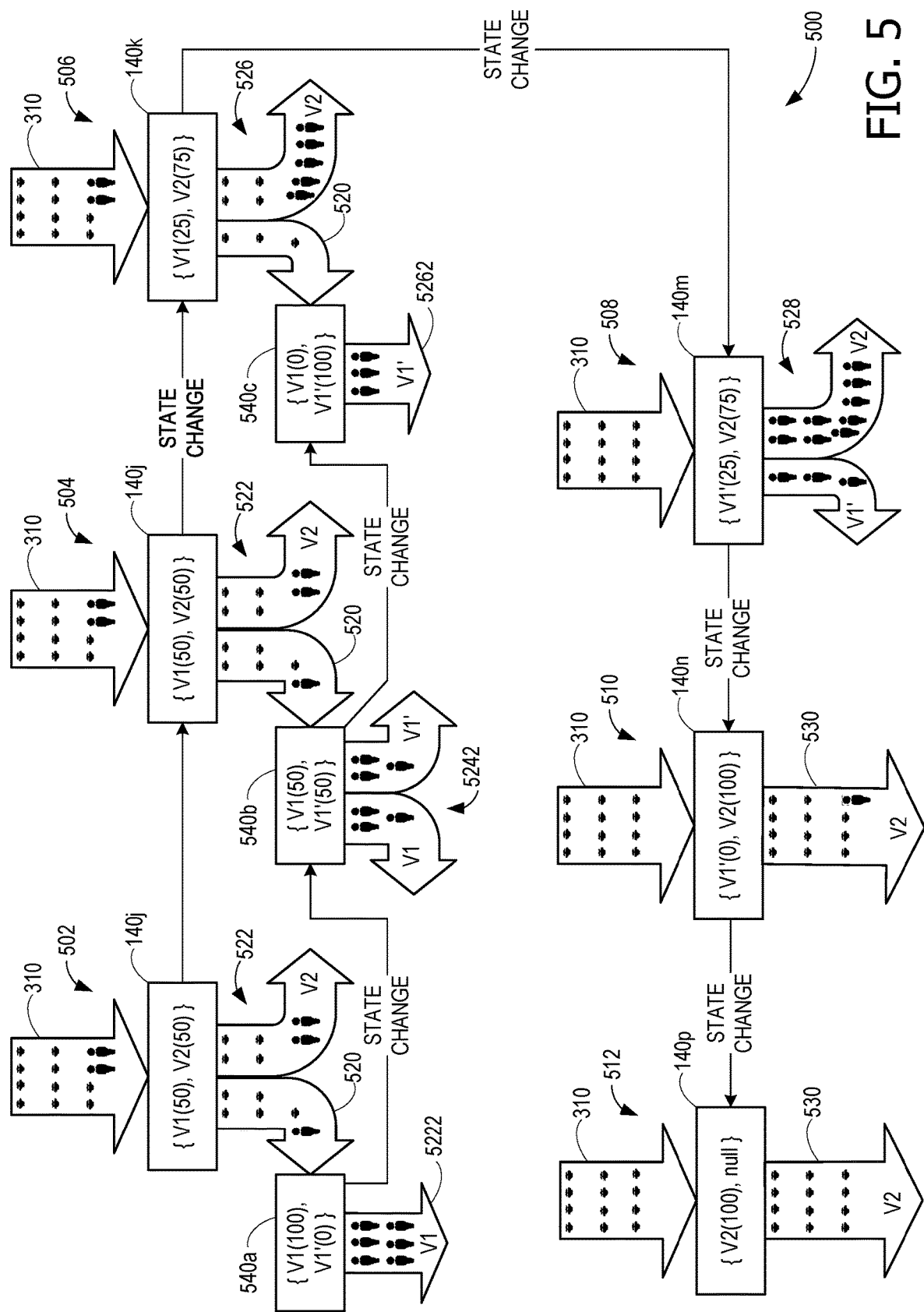
FIG. 5 illustrates exemplary hierarchical exposure trees at various stages of a configuration item roll-out, as performed by the arrangement of FIG. 1.

FIG. 5 illustrates exemplary hierarchical exposure trees at various stages of a pipeline 500 for a configuration item roll-out. In pipeline 500, there is a QFE for configuration item V1, producing updated configuration item V1' and resulting in hierarchical exposure trees. At stage 502, an exposure state 140j indicates branch weighting {V1(50), V2(50)}. The gives a binary branching exposure tree 522. The V1 branch of tree 522 is a set 520 of managed nodes for a second hierarchical tier. An exposure state 540a indicates branch weighting {V1(100), V1'(0)}, so initially, the second hierarchical tier is a non-branching tree 5222. Exposure state 540a is a configuration item branch exposure state. A state change occurs for the second hierarchical tier, to bring pipeline 500 to stage 504. The first tier is still at exposure state 140j, but the second tier now has an exposure state 540b indicating branch weighting {V1(50), V1'(50)}. Exposure state 540b is also a configuration item branch exposure state. This produces a branching tree 5242, in which half of set 520 (one portion of the exposure group) remains with configuration item V1, while the other half of set 520 (another portion of the exposure group) receives a deployment of updated configuration item V1'. This is an example of a hierarchical binary tree, because tree 522 at the first tier is binary, and tree 5242 (which branches from one side of tree 522) at the second tier, is also binary. At stage 504, half of set 310 receives configuration item V2, one-fourth (half of half) remains with configuration item V1, and one fourth receives updated configuration item V1'.

In the illustrated example, two state changes occur next, one for each hierarchical tier, to bring pipeline 500 to stage 506. Exposure state 140j is replaced with an exposure state 140k indicating branch weighting {V1(25), V2(75)}, resulting in a branching tree 526. Set 520 now has only one-fourth of set 310, down from half (that it had at stage 504). Exposure state 540b is replaced with an exposure state 540c indicating branch weighting {V1(0), V1'(100)}, resulting in a non-branching tree 5262. At stage 506, three-fourths of set 310 receives configuration item V2, and one fourth of set 310 (all of set 520, now) receives updated configuration item V1'.

For stage 508, another state change replaces exposure state 140k with an exposure state 140m indicating branch weighting {V1(25), V2(75)}. The actual result is the same as for stage 506, with three-fourths of set 310 receiving configuration item V2, and one fourth of set 310 receiving updated configuration item V1 '. The primary difference is notional. At stage 508, pipeline 500 has collapsed to only a single tier with a branching tree 528. Another state change takes pipeline 500 to stage 510, with an exposure state 140n indicating branch weighting {V1'(0), V2(100)}. This results in non-branching tree 530, in which all of set 310 receives configuration item V2. A final illustrated stage 512 results from a state change to an exposure state 140p indicating branch weighting {V2(100), null}. At this point, configuration item V2 has displaced both configuration item V1 and the temporarily-deployed updated configuration item V1'.

For pipeline 500, initiating a QFE roll-out for updated configuration item V1' does not halt the roll-out of configuration item V2. This is because, if a bug is not identified in configuration item V2 then the gradual exposure of configuration item V2 should continue to progress normally.

Figure 6:
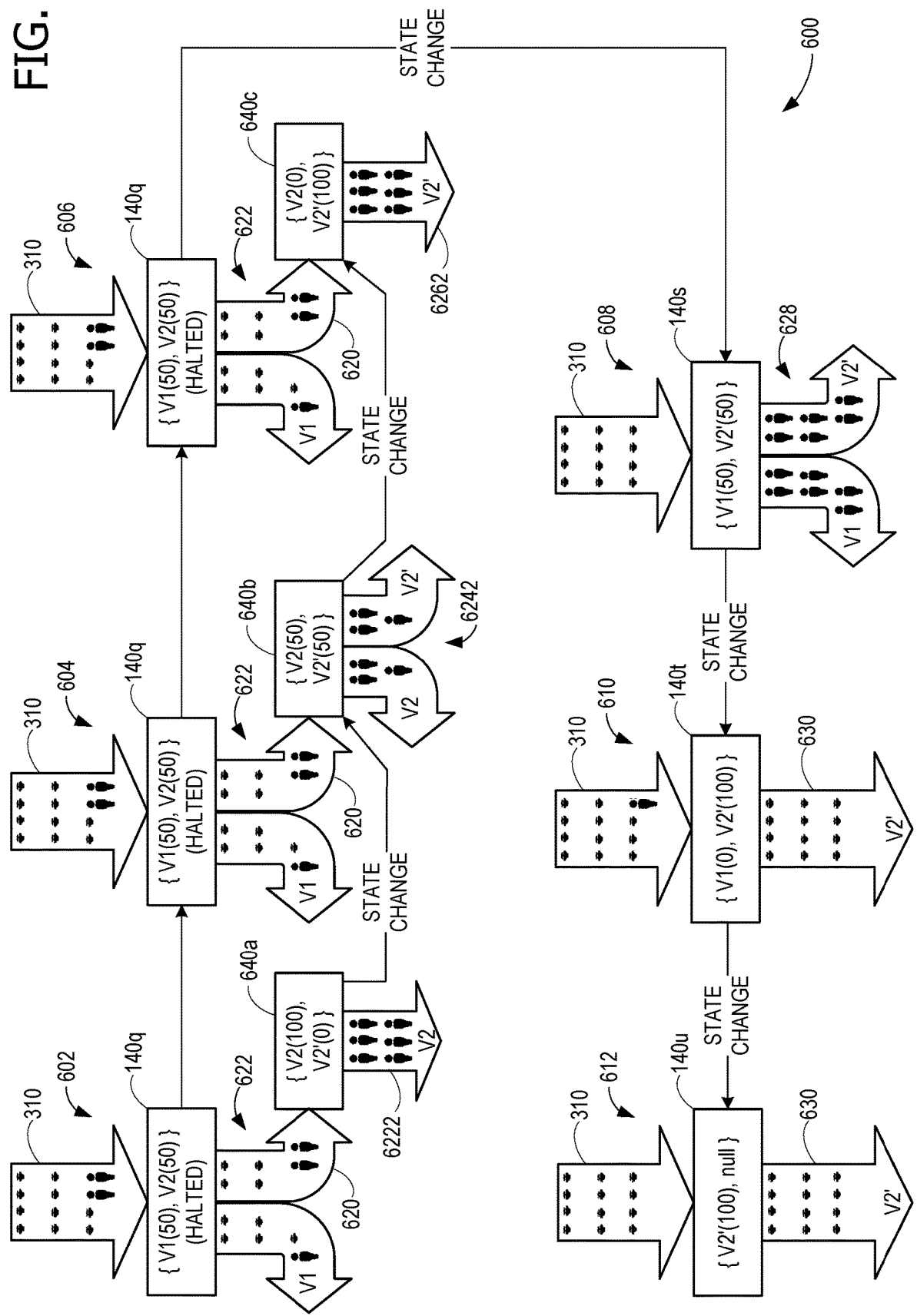
FIG. 6 also illustrates exemplary hierarchical exposure trees at various stages of a configuration item roll-out, as performed by the arrangement of FIG. 1.

FIG. 6 also illustrates exemplary hierarchical exposure trees at various stages of a configuration item roll-out, as performed by arrangement 100. In pipeline 600, there is a QFE for configuration item V2, producing updated configuration item V2' and also resulting in hierarchical exposure trees. In contrast with pipeline 500, for pipeline 600, initiating a QFE roll-out for configuration item V2' does halt the roll-out of configuration item V2. This is because, if a bug is identified in configuration item V2, then the gradual exposure of configuration item V2 should be halted to contain the problem until a solution (QFE updated configuration item V2') becomes available. Thus, in some examples, the deployment of configuration item V2 is halted until updated configuration item V2' is received, and then deployment of second configuration item V2 is resumed.

At stage 602, an exposure state 140q indicates branch weighting {V1(50), V2(50)}. The gives a binary branching exposure tree 622. The V2 branch of tree 622 is a set 620 of managed nodes for a second hierarchical tier. An exposure state 640a indicates branch weighting {V2(100), V2'(0)}, so initially, the second hierarchical tier is a non-branching tree 6222. Exposure state 640a is a configuration item branch exposure state. A state change occurs for the second hierarchical tier, to bring pipeline 600 to stage 604. The first tier is still at exposure state 140q, but the second tier now has an exposure state 640b indicating branch weighting {V2(50), V2'(50)}. This produces a branching tree 6242, in which half of set 620 receives configuration item V2, while the other half of set 620 receives a deployment of updated configuration item V2'. This is another example of a hierarchical binary tree, because tree 622 at the first tier is binary, and tree 6242 (which branches from one side of tree 622) at the second tier, is also binary. At stage 604, half of set 310 remains with configuration item V1, one-fourth (half of half, which is a portion of set 310) receives configuration item V2, and one fourth (another portion) receives updated configuration item V2'.

In the illustrated example, only one state change occurs next, to bring pipeline 600 to stage 606. The first tier is halted, and so remains at exposure state 140k. Exposure state 640b is replaced with an exposure state 640c indicating branch weighting {V2(0), V2'(100)}, resulting in a non-branching tree 6262. Exposure state 640b is also a configuration item branch exposure state. At stage 606, half of set 310 (one portion) remains with configuration item V1 half of set 310 (another portion that now includes all of set 620) receives updated configuration item V2'. Configuration item V2 is now fully displaced ad no longer being deployed.

For stage 608, another state change replaces exposure state 140q with an exposure state 140s indicating branch weighting {V1(50), V2'(5o)}. The actual result is the same as for stage 606, with half of set 310 receiving updated configuration item V2', and half of set 310 receiving configuration item V1. The primary difference is notional. At stage 608, pipeline 600 has collapsed to only a single tier with a branching tree 628. Another state change takes pipeline 600 to stage 610, with an exposure state 140t indicating branch weighting {V1(0), V2'(100)}. This results in non-branching tree 630, in which all of set 310 receives updated configuration item V2'. A final illustrated stage 612 results from a state change to an exposure state 140u indicating branch weighting {V2'(100), null} . At this point, updated configuration item V2' has displaced both configuration item V1 and the temporarily-deployed configuration item V2.

Revisiting FIG. 1, arrangement 100 provides a solution for management of configuration change control. In operation, aspects of arrangement 100 receive a second configuration item V2 for displacement, in an exposure group, of a first configuration item V1; receive, from central orchestrator 104, an exposure state 140, wherein exposure state 140 indicates an exposure tree comprising a first configuration item branch and a second configuration item branch; determine, for the exposure group, based at least on exposure state 140: a first portion of the exposure group to continue with first configuration item V1, and a second portion of the exposure group to receive second configuration item V2; deploy second configuration item V2 to the second portion of the exposure group, in accordance with the exposure state; based at least on a first trigger event, receive, from central orchestrator 104, an updated exposure state (e.g., exposure state 140a); and deploy second configuration item V2 in accordance with the updated exposure state.

In some examples, the first configuration item and the second configuration item each comprises a software application version. In some examples, the operations include providing, at central orchestrator 104, exposure state 140 (or a subsequent exposure state); and based at least on a second trigger event, updating, at central orchestrator 104, the exposure state. In some examples, the exposure state indicates a binary tree comprising branches indicating either: a first set comprising a configuration item and a null placeholder; or a second set comprising a first configuration item branch weight and a second configuration item branch weight. In some examples, determining the first portion of the exposure group and the second portion of the exposure group comprises: determining a threshold based at least on the first configuration item branch weight or the second configuration item branch weight; performing a deterministic operation on data associated with each member of the exposure group to generate a member value; comparing, for at least one member of the exposure group, the threshold with the member value; and based at least on the comparison, assigning the at least one member of the exposure group to the first portion of the exposure group or the second portion of the exposure group.

In some examples, the operations include generating a hierarchical exposure tree by further branching the first configuration item branch or the second configuration item branch. In some examples, further branching the first configuration item branch comprises: receiving an updated first configuration item V1' for displacement of first configuration item V1; receiving a first configuration item branch exposure state, wherein the first configuration item branch exposure state indicates an exposure tree branch comprising an original first configuration item branch and an updated first configuration item branch; determining, based at least on the exposure state: a third portion of the exposure group to continue with first configuration item V1, and a fourth portion of the exposure group to receive updated first configuration item V1'; and deploying updated first configuration item V1' to the fourth portion of the exposure group, in accordance with the first configuration item branch exposure state and the exposure state.

In some examples, further branching the second configuration item branch comprises: receiving an updated second configuration item V2' for displacement of second configuration item V2; receiving a second configuration item branch exposure state, wherein the second configuration item branch exposure state indicates an exposure tree branch comprising an original second configuration item branch and an updated second configuration item branch; determining, based at least on the exposure state: a fifth portion of the exposure group to continue with second configuration item V2, and a sixth portion of the exposure group to receive updated second configuration item V2'; deploying second configuration item V2 to the fifth portion of the exposure group, in accordance with the second configuration item branch exposure state and the exposure state; and deploying updated second configuration item V2' to the sixth portion of the exposure group, in accordance with the second configuration item branch exposure state and the exposure state. In some examples, operations include based at least on a third trigger event, halting the deployment of second configuration item V2; and based at least on receiving updated second configuration item V2', resuming deployment of second configuration item V2.

FIGS. 7A and 7B show pseudocode for an exemplary JavaScript Object Notation (JSON) configuration file 700 for management of configuration changes, as performed by arrangement 100. FIG. 7A and 7B should be viewed as a continuous listing, with a portion 700b of FIG. 7B immediately following a portion 700a of FIG. 7A. in the illustrated example, file 700 is defining a pipeline for deploying a configuration item named "TestApplication" to an exposure group named "Group2" in two geographical regions: western us (the western portion of the United States) and eastern us (the eastern portion of the United States). The gradual exposure type is a ramped percentage, consistent with FIGS. 5 and 6. There are three different branch weightings: {0,100}; {50,50}; and {100,0}. In some examples, a larger number of different branch weightings are used, for example: {0,100}; {25,75}; {50,50}; {75,25}; and {100,0}; or {0,100}; {20,80}; {40,60}; {60,40}; {80,20}; and {100, 0}.

An exposure pivot can be defined by a tenant, and in the illustrated example, it is set to an environmentID. When polling central orchestrator 104, tenant orchestrator furnishes its exposure pivot to identify its request for the current exposure state. This is because gradual exposure service 102 can service multiple tenant environments (e.g., tenant environments 120 and 102a) and multiple hierarchical tiers (e.g., exposure states 140k and 540c). Additional aspects of file 700 indicate that the wait time for each state is an hour (3600 seconds), and that performance data is collected (e.g., collected data 138) to be analyzed and produce metric data 144.

Figure 8:
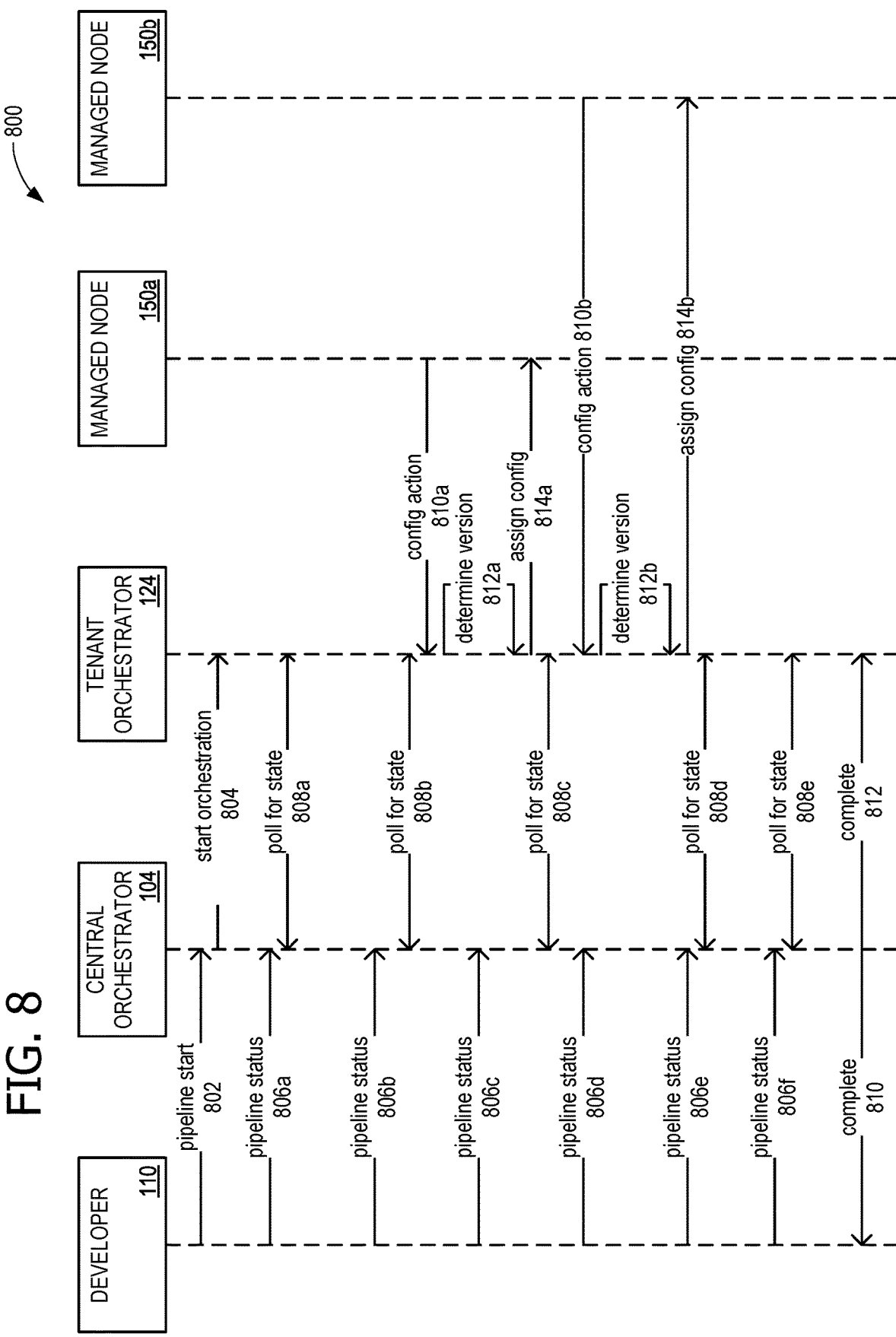
FIG. 8 illustrates an exemplary messaging sequence performed within the arrangement of FIG. 1.

FIG. 8 illustrates an exemplary messaging sequence 800 performed within arrangement 100. Developer 110 sends a message 802 to start a pipeline (e.g., begin a new roll-out) to central orchestrator 104. Central orchestrator 104 starts the orchestration of the new pipeline with message 804 to tenant orchestrator 124. Central orchestrator 104 and tenant orchestrator 124 set up timers for triggering state changes and polling for state changes. Developer 110 also begins sending a series of pipeline status messages 806a-806f to central orchestrator 104, to indicate to central orchestrator 104 whether the roll-out is proceeding normally, whether to halt the pipeline for a QFE, or whether a QFE configuration item is available and is to be added to the pipeline.

Tenant orchestrator 124 begins polling central orchestrator 104 for state changes with messages 808a-808e, and receives the current exposure state from central orchestrator 104. Managed node 150a sends a configuration action message 810a to tenant orchestrator 124, asking for configuration management operations, such as deploying new configuration items or verifying that the existing configuration item at managed node 150a is the currently-assigned configuration item. Tenant orchestrator 124 determines the configuration item to assign to managed node 150a in process 812a and sends a message 814a to inform managed node 150a of the assigned configuration item. In some scenarios, message 814a assigns a new configuration item to managed node 150a. Managed node 150b sends a configuration action message 810b to tenant orchestrator 124, asking for configuration management operations. Tenant orchestrator 124 determines the configuration item to assign to managed node 150b in process 812b and sends a message 814b to inform managed node 150b of the assigned configuration item.

When the exposure state indicates that the pipeline is complete, tenant orchestrator 124 sends a message 810 to developer 110 and a message 812 to tenant orchestrator 124 indicating that the pipeline is completed. Developer 110 then halts the series of pipeline status messages and tenant orchestrator 124 ceases polling central orchestrator 104 for state changes.

Figure 9:
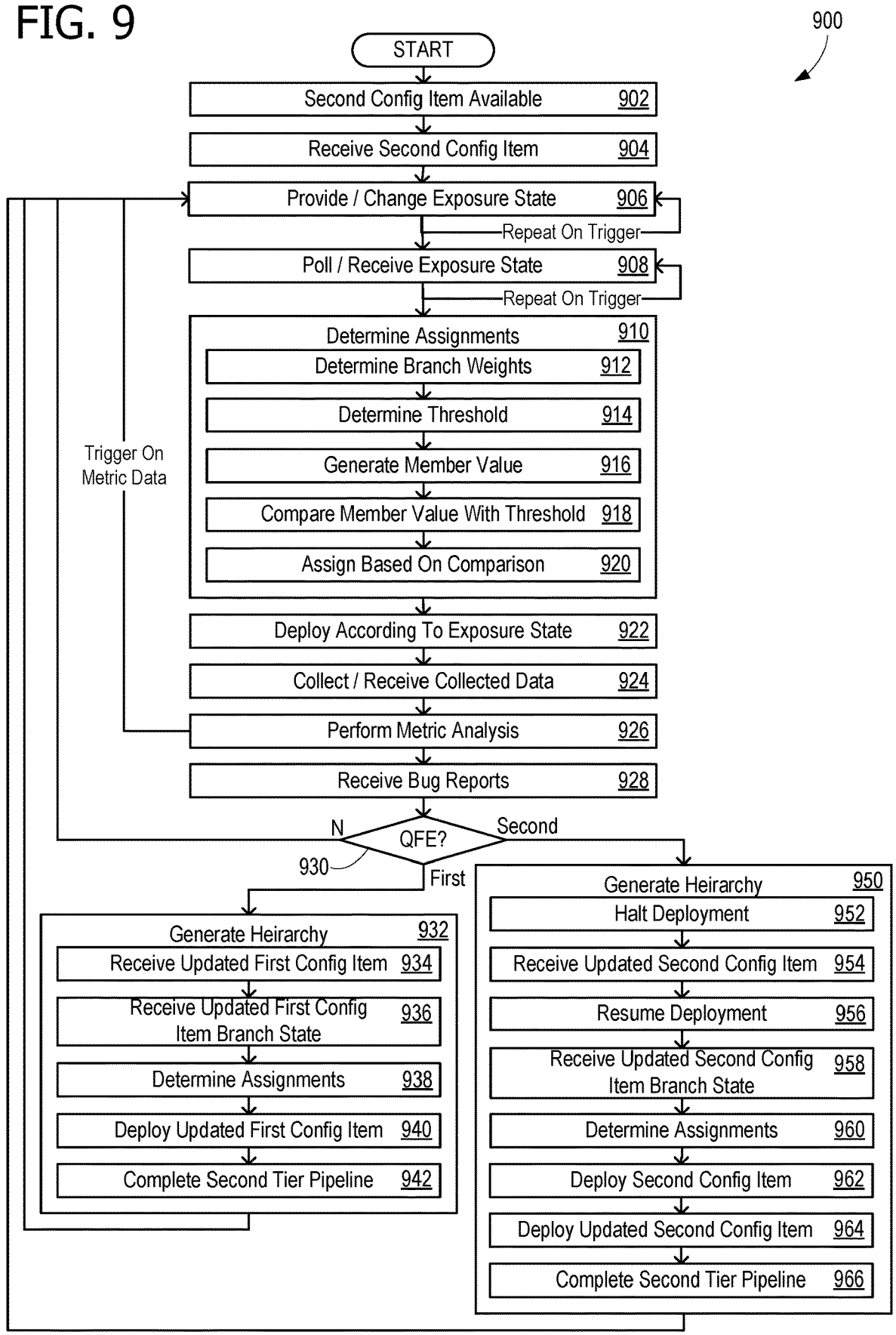
FIG. 9 is a flow chart illustrating exemplary operations involved in configuration change control, as performed by the arrangement of FIG. 1.

FIG. 9 is a flow chart 900 illustrating exemplary operations involved in configuration change control, as performed by arrangement 100. In some examples, operations described for flow chart 900 are performed by computing device 1100 of FIG. 11. Flow chart 900 commences with operation 902, in which a developer generates second configuration item for displacement of a first configuration item in an exposure group. This kick-off acts as a trigger event. Operation 904 includes receiving the second configuration item for displacement, in an exposure group, of the first configuration item. In some examples, the first configuration item and the second configuration item each comprises a software application version. Operation 906 includes providing, at a central orchestrator, the exposure state, wherein the exposure state indicates a binary exposure tree comprising a first configuration item branch and a second configuration item branch. In some examples, the branches indicate either: a first set comprising a configuration item and a null placeholder, or a second set comprising a first configuration item branch weight and a second configuration item branch weight.

Operation 906 repeats on a trigger event, for example a timer event. Operation 906 also repeats when triggered on metric date, from operation 926. On a subsequent pass, operation 906 includes, based at least on a first trigger event, updating, at the central orchestrator, the exposure state. Flow chart returns to operation 906 at multiple points, such as one option of decision operation 930, and upon completion of operations 932 and 950. Flow chart 900 also ends upon operation 906 reaching a state of completion for the pipeline. If, however, completion has not been reached, flow chart 900 proceeds to operation 908.

Operation 908 includes receiving, from the central orchestrator, the exposure state. Operation 908 also repeats on a trigger evet, for example a second timer event or some other event. On a subsequent pass, operation 908 includes, based at least on a second trigger event, receiving, from the central orchestrator, an updated exposure state. Operation 910 includes determining, for the exposure group, based at least on the exposure state: a first portion of the exposure group to continue with the first configuration item, and a second portion of the exposure group to receive the second configuration item. In some examples, operation 910 includes operations 912-918. Branch weights are determined from the exposure state in operation 912. Operation 914 includes determining a threshold based at least on the first configuration item branch weight or the second configuration item branch weight. Operation 916 includes performing a deterministic operation on data associated with each member of the exposure group to generate a member value, and operation 918 includes comparing, for at least one member of the exposure group, the threshold with the member value. Operation 920 includes based at least on the comparison, assigning the at least one member of the exposure group to the first portion of the exposure group or the second portion of the exposure group. Operation 922 then includes deploying the second configuration item to the second portion of the exposure group, in accordance with the exposure state. In a subsequent pass, operation 922 includes deploying the second configuration item in accordance with the updated exposure state.

Performance data, indicating the stability of the roll-out is collected in operation 924 and received by an analysis node, such as a gradual exposure service, or another node. A metric analysis is performed on the collected data in operation 926. The metric data may show sufficient stability to progress to the next exposure state. If so, flow chart 900 returns to operation 906, in which an exposure state change is triggered on the metric data. If, however, there are any performance issues, such as bugs, bug reports are received in operation 928. Decision operation 930 determines whether a QFE is needed. If not, flow chart 900 returns to operation 906. Two QFE possibilities exist: The first configuration item needs a QFE, and/or the second configuration item needs a QFE.

If the first configuration item requires QFE, operation 932 includes generating a hierarchical exposure tree by further branching the first configuration item branch. In some examples, operation 932 includes operations 934-942. Operation 934 includes receiving an updated first configuration item for displacement of the first configuration item. Operation 936 includes receiving a first configuration item branch exposure state. In some examples, the first configuration item branch exposure state indicates an exposure tree branch comprising an original first configuration item branch and an updated first configuration item branch. Assignments are determined in operation 938, similarly as in operation 910, but for the second hierarchical tier. For example, operation 938 includes determining, based at least on the exposure state: a third portion of the exposure group to continue with the first configuration item, and a fourth portion of the exposure group to receive the updated first configuration item. Operation 940 includes deploying the updated first configuration item to the fourth portion of the exposure group, in accordance with the first configuration item branch exposure state. The states of the second tier pipeline are exhausted, so that the second tier pipeline is completed in operation 942. Flow chart 900 then returns to operation 906.

If the second configuration item requires QFE, operation 950 includes generating a hierarchical exposure tree by further branching the second configuration item branch. In some examples, operation 950 includes operations 952-966. Operation 952 includes based at least on a third trigger event, halting the deployment of the second configuration item. In some examples, the third trigger event is a bug report received in operation 928. Operation 954 includes receiving an updated second configuration item for displacement of the second configuration item, and operation 956 includes, based at least on receiving the updated second configuration item, resuming deployment of the second configuration item.

Operation 958 includes receiving a second configuration item branch exposure state. In some examples, the second configuration item branch exposure state indicates an exposure tree branch comprising an original second configuration item branch and an updated second configuration item branch. Assignments are determined in operation 960, similarly as in operation 910, but for the second hierarchical tier. For example, operation 960 includes determining, based at least on the exposure state: a fifth portion of the exposure group to continue with the second configuration item, and a sixth portion of the exposure group to receive the updated second configuration item. Operation 962 includes deploying the second configuration item to the fifth portion of the exposure group, in accordance with the second configuration item branch exposure state. Operation 964 includes deploying the updated second configuration item to the sixth portion of the exposure group, in accordance with the second configuration item branch exposure state. The states of the second tier pipeline are exhausted, so that the second tier pipeline is completed in operation 966. Flow chart 900 then returns to operation 906.

Figure 10:
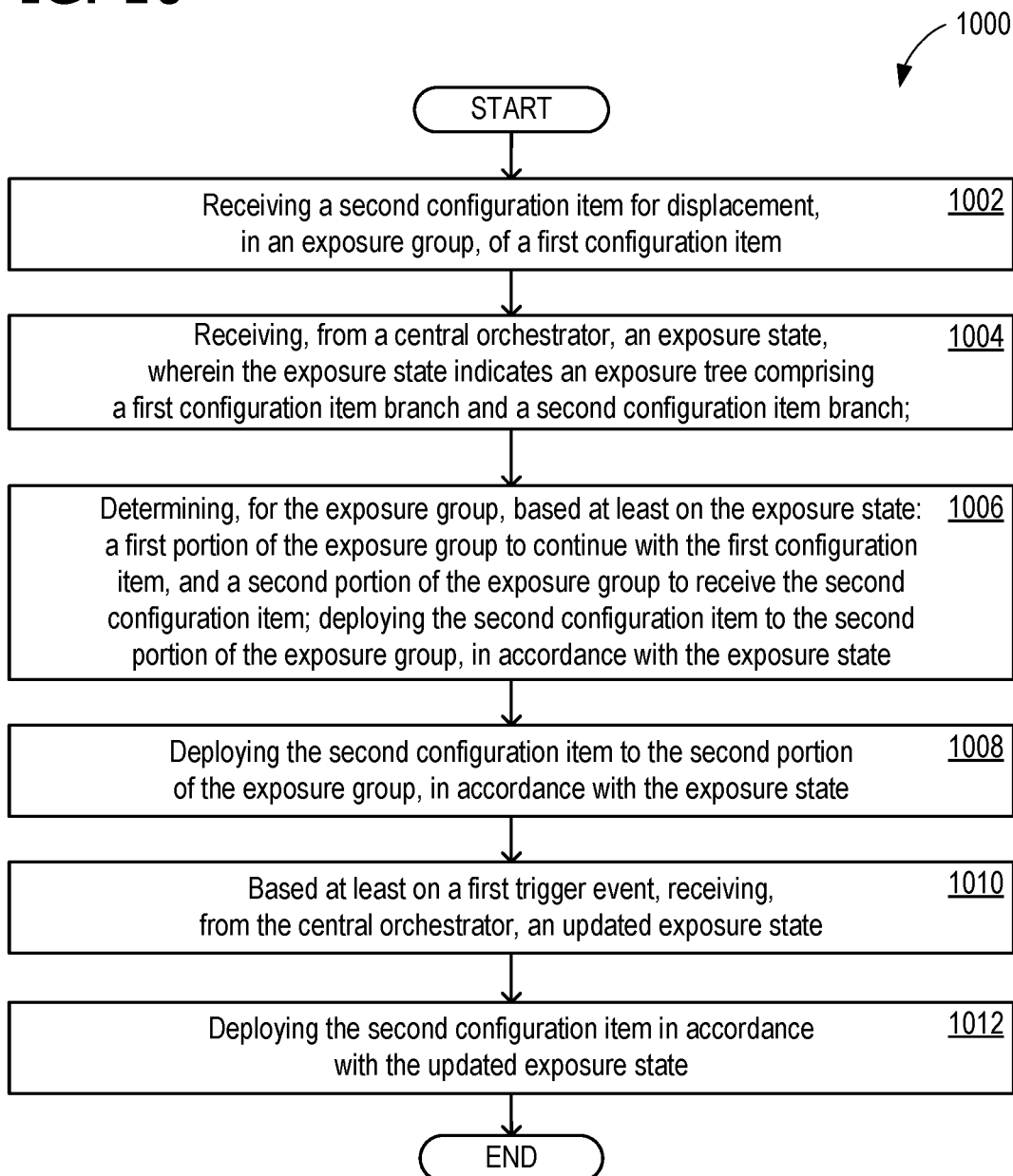
FIG. 10 is another flow chart illustrating exemplary operations involved in configuration change control, as performed by the arrangement of FIG. 1.

FIG. 10 is a flow chart 1000 illustrating exemplary operations involved in configuration change control, as performed by arrangement 100. In some examples, operations described for flow chart 1000 are performed by computing device 1100 of FIG. 11. Flow chart 1000 commences with operation 1002, which includes receiving a second configuration item for displacement, in an exposure group, of a first configuration item. Operation 1004 includes receiving, from a central orchestrator, an exposure state, wherein the exposure state indicates an exposure tree comprising a first configuration item branch and a second configuration item branch. Operation 1006 includes determining, for the exposure group, based at least on the exposure state: a first portion of the exposure group to continue with the first configuration item, and a second portion of the exposure group to receive the second configuration item.

Operation 1008 includes deploying the second configuration item to the second portion of the exposure group, in accordance with the exposure state. Operation 1010 includes based at least on a first trigger event, receiving, from the central orchestrator, an updated exposure state. Operation 1012 includes deploying the second configuration item in accordance with the updated exposure state.

Additional Examples

Some aspects and examples disclosed herein are directed to a system for management of configuration changes comprising: a processor; and a computer-readable medium storing instructions that are operative upon execution by the processor to: receive a second configuration item for displacement, in an exposure group, of a first configuration item; receive, from a central orchestrator, an exposure state, wherein the exposure state indicates an exposure tree comprising a first configuration item branch and a second configuration item branch; determine, for the exposure group, based at least on the exposure state: a first portion of the exposure group to continue with the first configuration item, and a second portion of the exposure group to receive the second configuration item; deploy the second configuration item to the second portion of the exposure group, in accordance with the exposure state; based at least on a first trigger event, receive, from the central orchestrator, an updated exposure state; and deploy the second configuration item in accordance with the updated exposure state.

Additional aspects and examples disclosed herein are directed to a method of configuration change control comprising: receiving a second configuration item for displacement, in an exposure group, of a first configuration item; receiving, from a central orchestrator, an exposure state, wherein the exposure state indicates an exposure tree comprising a first configuration item branch and a second configuration item branch; determining, for the exposure group, based at least on the exposure state: a first portion of the exposure group to continue with the first configuration item, and a second portion of the exposure group to receive the second configuration item; deploying the second configuration item to the second portion of the exposure group, in accordance with the exposure state; based at least on a first trigger event, receiving, from the central orchestrator, an updated exposure state; and deploying the second configuration item in accordance with the updated exposure state.

Additional aspects and examples disclosed herein are directed to one or more computer storage devices having computer-executable instructions stored thereon for configuration change control, which, on execution by a computer, cause the computer to perform operations comprising: receiving a second configuration item for displacement, in an exposure group, of a first configuration item, wherein the first configuration item and the second configuration item each comprises a software application version; providing, at a central orchestrator, the exposure state, wherein the exposure state indicates a binary exposure tree comprising a first configuration item branch and a second configuration item branch, the branches indicating either: a first set comprising a configuration item and a null placeholder, or a second set comprising a first configuration item branch weight and a second configuration item branch weight; receiving, from the central orchestrator, the exposure state; determining, for the exposure group, based at least on the exposure state: a first portion of the exposure group to continue with the first configuration item, and a second portion of the exposure group to receive the second configuration item, wherein determining the first portion of the exposure group and the second portion of the exposure group comprises: determining a threshold based at least on the first configuration item branch weight or the second configuration item branch weight; performing a deterministic operation on data associated with each member of the exposure group to generate a member value; comparing, for at least one member of the exposure group, the threshold with the member value; and based at least on the comparison, assigning the at least one member of the exposure group to the first portion of the exposure group or the second portion of the exposure group; deploying the second configuration item to the second portion of the exposure group, in accordance with the exposure state; based at least on a first trigger event, updating, at the central orchestrator, the exposure state; based at least on a second trigger event, receiving, from the central orchestrator, an updated exposure state; and deploying the second configuration item in accordance with the updated exposure state.

Alternatively, or in addition to the other examples described herein, examples include any combination of the following:

the first configuration item and the second configuration item each comprises a software application version;
    providing, at the central orchestrator, the exposure state;
    based at least on a second trigger event, updating, at the central orchestrator, the exposure state;
    the exposure state indicates a binary tree comprising branches indicating either: a first set comprising a configuration item and a null placeholder, or a second set comprising a first configuration item branch weight and a second configuration item branch weight;
    determining the first portion of the exposure group and the second portion of the exposure group comprises: determining a threshold based at least on the first configuration item branch weight or the second configuration item branch weight; performing a deterministic operation on data associated with each member of the exposure group to generate a member value; comparing, for at least one member of the exposure group, the threshold with the member value; and based at least on the comparison, assigning the at least one member of the exposure group to the first portion of the exposure group or the second portion of the exposure group;

determining a threshold based at least on the first configuration item branch weight or the second configuration item branch weight;

performing a deterministic operation on data associated with each member of the exposure group to generate a member value;

comparing, for at least one member of the exposure group, the threshold with the member value;

based at least on the comparison, assigning the at least one member of the exposure group to the first portion of the exposure group or the second portion of the exposure group;

generating a hierarchical exposure tree by further branching the first configuration item branch or the second configuration item branch;

further branching the first configuration item branch comprises: receiving an updated first configuration item for displacement of the first configuration item; receiving a first configuration item branch exposure state, wherein the first configuration item branch exposure state indicates an exposure tree branch comprising an original first configuration item branch and an updated first configuration item branch; determining, based at least on the exposure state: a third portion of the exposure group to continue with the first configuration item, and a fourth portion of the exposure group to receive the updated first configuration item; and deploying the updated first configuration item to the fourth portion of the exposure group, in accordance with the first configuration item branch exposure state and the exposure state.

receiving an updated first configuration item for displacement of the first configuration item;

receiving a first configuration item branch exposure state, wherein the first configuration item branch exposure state indicates an exposure tree branch comprising an original first configuration item branch and an updated first configuration item branch;

determining, based at least on the exposure state: a third portion of the exposure group to continue with the first configuration item, and a fourth portion of the exposure group to receive the updated first configuration item;

deploying the updated first configuration item to the fourth portion of the exposure group, in accordance with the first configuration item branch exposure state and the exposure state;

further branching the second configuration item branch comprises: receiving an updated second configuration item for displacement of the second configuration item; receiving a second configuration item branch exposure state, wherein the second configuration item branch exposure state indicates an exposure tree branch comprising an original second configuration item branch and an updated second configuration item branch; determining, based at least on the exposure state: a fifth portion of the exposure group to continue with the second configuration item, and a sixth portion of the exposure group to receive the updated second configuration item; deploying the second configuration item to the fifth portion of the exposure group, in accordance with the second configuration item branch exposure state and the exposure state; and deploying the updated second configuration item to the sixth portion of the exposure group, in accordance with the second configuration item branch exposure state and the exposure state;

receiving an updated second configuration item for displacement of the second configuration item;

receiving a second configuration item branch exposure state, wherein the second configuration item branch exposure state indicates an exposure tree branch comprising an original second configuration item branch and an updated second configuration item branch;

determining, based at least on the exposure state:

a fifth portion of the exposure group to continue with the second configuration item, and a sixth portion of the exposure group to receive the updated second configuration item;

deploying the second configuration item to the fifth portion of the exposure group, in accordance with the second configuration item branch exposure state and the exposure state; and deploying the updated second configuration item to the sixth portion of the exposure group, in accordance with the second configuration item branch exposure state and the exposure state;

based at least on a third trigger event, halting the deployment of the second configuration item;

based at least on receiving the updated second configuration item, resuming deployment of the second configuration item.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
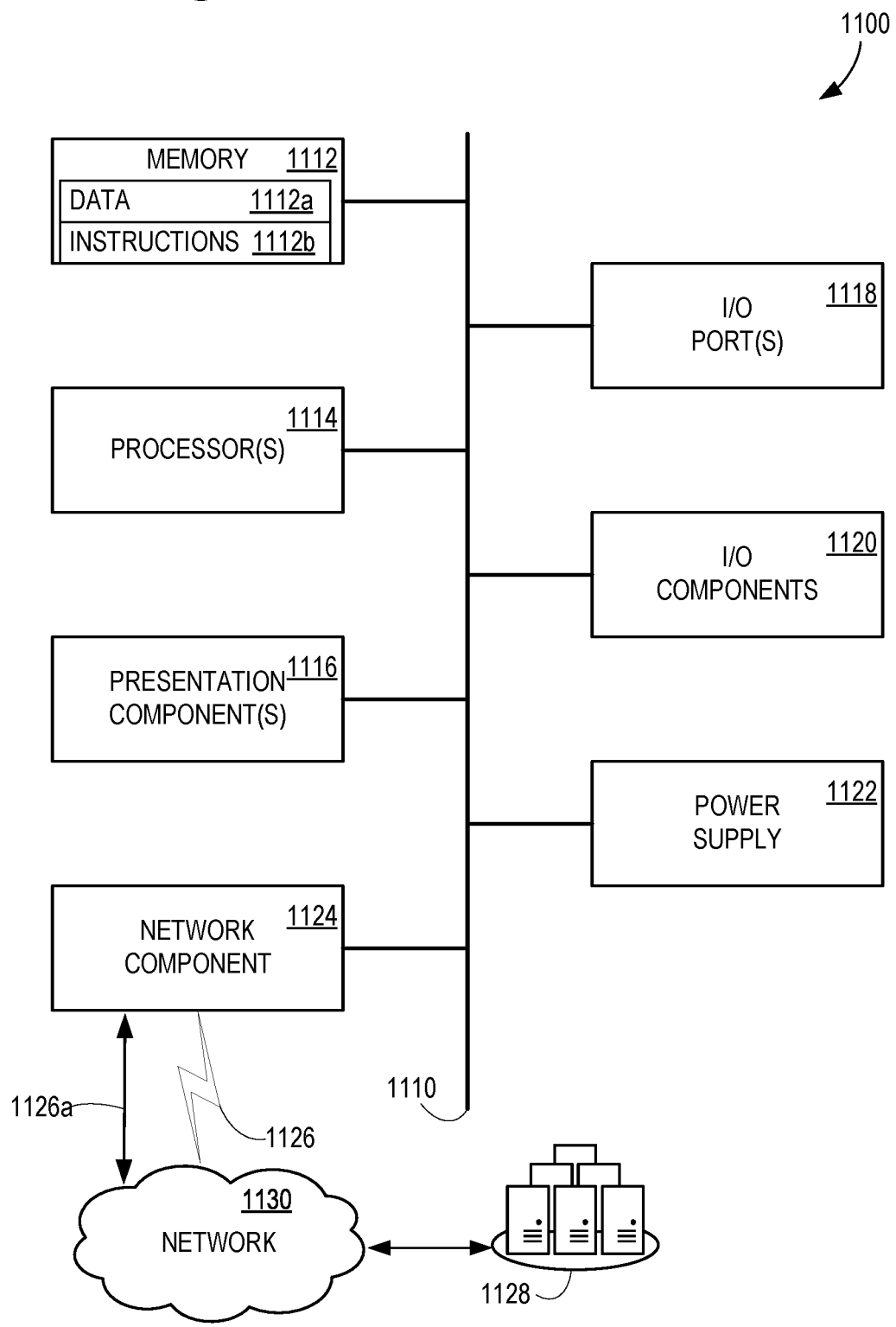
FIG. 11 is a block diagram of an example computing environment suitable for implementing some of the various examples disclosed herein.

FIG. 11 is a block diagram of an example computing device 1100 for implementing aspects disclosed herein, and is designated generally as computing device 1100. Computing device 1100 is but one example of a suitable computing environment and is not intended to suggest any limitation as to the scope of use or functionality of the examples disclosed herein. Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer-storage memory 1112, one or more processors 1114, one or more presentation components 1116, I/O ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer-storage media references below and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein.

In some examples, memory 1112 includes computer-storage media in the form of volatile and/or nonvolatile memory, removable or non-removable memory, data disks in virtual environments, or a combination thereof. Memory 1112 may include any quantity of memory associated with or accessible by the computing device 1100. Memory 1112 may be internal to the computing device 1100 (as shown in FIG. 11), external to the computing device 1100 (not shown), or both (not shown). Examples of memory 1112 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1100. Additionally, or alternatively, the memory 1112 may be distributed across multiple computing devices 1100, for example, in a virtualized environment in which instruction processing is carried out on multiple devices 1100. For the purposes of this disclosure, "computer storage media," "computer-storage memory," "memory," and "memory devices" are synonymous terms for the computer-storage memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

The computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1112a to a cloud resource 1128 across network 1130. Various different examples of communication links 1126 and 1112a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of " The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for management of configuration changes, the system comprising:
   a processor; and
   a computer-readable medium storing instructions that are operative upon execution by the processor to:
   receive a second configuration item for displacement, in an exposure group comprising a plurality of managed nodes, of a first configuration item;
   receive an exposure state, wherein the exposure state indicates a hierarchical binary tree comprising a first tier;
   determine, for the exposure group, based at least on the first tier of the exposure state:
      a first portion of the exposure group to continue with the first configuration item, and
      a second portion of the exposure group to receive the second configuration item;
   perform a deployment of the second configuration item to the second portion of the exposure group, in accordance with the exposure state;
   store performance data, the performance data related to performance of the first configuration item and the second configuration item, in collected data during the deployment;
   receive an updated first configuration item;
   receive an updated exposure state, wherein the updated exposure state indicates a hierarchical binary tree comprising the first tier and a second tier;
   determine, for the first portion of the exposure group, based at least on the second tier of the exposure state:
      a third portion of the exposure group to continue with the first configuration item, and
      a fourth portion of the exposure group to receive the updated first configuration item; and
   deploy the updated first configuration item to the fourth portion concurrently with the deployment of the second configuration item to the second portion.

2. The system of claim 1, wherein the instructions are further operative to:
   analyze the collected data; and
   generate metric data based on the collected data.

3. The system of claim 2, wherein the instructions are further operative to:
   determine, based on the metric data, whether a corrective action is needed.

4. The system of claim 3, wherein the corrective action is a quick-fix engineering (QFE).

5. The system of claim 4, wherein the instructions are further operative to:
   determine whether the QFE is needed for the first configuration item; and
   based on the determination that the QFE is needed for the first configuration item, receive the updated first configuration item for displacement of the first configuration item.

6. The system of claim 4, wherein the instructions are further operative to:
   determine whether the QFE is needed for the second configuration item;

based on the determination that the QFE is needed for the second configuration item, halt the deployment;
receive an updated second configuration item for displacement of the second configuration item;
receive a second configuration item branch exposure state;
determine, for the second portion of the exposure group, based at least on the second configuration item branch exposure state:
a fifth portion of the exposure group to continue with the second configuration item, and
a sixth portion of the exposure group to receive the updated second configuration item; and
deploy the updated second configuration item to the sixth portion, in accordance with the second configuration item branch exposure state.

7. The system of claim 1, wherein the performance data indicates stability of the deployment.

8. The system of claim 3, wherein the corrective action is at least one of: a hot-fix, a patch, a rollback, a fast forward, and a halt.

9. A method of configuration change control, the method comprising:
receiving a second configuration item for displacement, in an exposure group comprising a plurality of managed nodes, of a first configuration item;
receiving an exposure state, wherein the exposure state indicates a hierarchical binary tree comprising a first tier;
determining, for the exposure group, based at least on the first tier of the exposure state:
a first portion of the exposure group to continue with the first configuration item, and
a second portion of the exposure group to receive the second configuration item;
performing a deployment of the second configuration item to the second portion of the exposure group, in accordance with the exposure state;
storing performance data, the performance data related to performance of the first configuration item and the second configuration item, in collected data during the deployment;
receiving an updated first configuration item;
receiving an updated exposure state, wherein the updated exposure state indicates a hierarchical binary tree comprising the first tier and a second tier;
determining, for the exposure group, based at least on the second tier of the exposure state:
a third portion of the exposure group to continue with the first configuration item, and
a fourth portion of the exposure group to receive the updated first configuration item; and
deploying the updated first configuration item to the fourth portion concurrently with the deployment of the second configuration item to the second portion.

10. The method of claim 9, further comprising:
analyzing the collected data; and
generating metric data based on the collected data.

11. The method of claim 10, further comprising:
determining, based on the metric data, whether a corrective action is needed.

12. The method of claim 11, wherein the corrective action is a quick-fix engineering (QFE).

13. The method of claim 12, further comprising:
determining whether the QFE is needed for the first configuration item; and
based on determining the QFE is needed for the first configuration item, receiving the updated first configuration item for displacement of the first configuration item.

14. The method of claim 12, further comprising:
determining whether the QFE is needed for the second configuration item;
based on determining the QFE is needed for the second configuration item, halting the deployment;
receiving an updated second configuration item for displacement of the second configuration item;
receiving a second configuration item branch exposure state;
determining, for the second portion of the exposure group, based at least on the second configuration item branch exposure state:
a fifth portion of the exposure group to continue with the second configuration item, and
a sixth portion of the exposure group to receive the updated second configuration item; and
deploying the updated second configuration item to the sixth portion, in accordance with the second configuration item branch exposure state.

15. The method of claim 9, wherein the performance data indicates stability of the deployment.

16. The method of claim 11, wherein the corrective action is at least one of: a hot-fix, a patch, a rollback, a fast forward, and a halt.

17. One or more computer storage devices having computer-executable instructions stored thereon for configuration change control, which, on execution by a computer, cause the computer to perform operations comprising:
receiving a second configuration item for displacement, in an exposure group comprising a plurality of managed nodes, of a first configuration item;
receiving an exposure state, wherein the exposure state indicates a hierarchical binary tree comprising a first tier;
determining, for the exposure group, based at least on the first tier of the exposure state:
a first portion of the exposure group to continue with the first configuration item, and
a second portion of the exposure group to receive the second configuration item;
performing a deployment of the second configuration item to the second portion of the exposure group, in accordance with the exposure state;
storing performance data, the performance data related to performance of the first configuration item and the second configuration item, in collected data during the deployment;
analyzing the collected data;
generating metric data based on the collected data, wherein the metric data indicates stability of the deployment; and
determining, based on the metric data, whether a corrective action is needed for the first configuration item;
based on determining the corrective action is needed for the first configuration item, receiving an updated first configuration item;
receiving an updated exposure state, wherein the updated exposure state indicates a hierarchical binary tree comprising the first tier and a second tier;
determining, for the exposure group, based at least on the second tier of the exposure state:
a third portion of the exposure group to continue with the first configuration item, and a fourth portion of the exposure group to receive the updated first configuration item; and deploying the updated first configuration item to the fourth portion concurrently with the deployment of the second configuration item to the second portion.

18. The one or more computer storage devices of claim 17, wherein the corrective action is a quick-fix engineering (QFE).

19. The one or more computer storage devices of claim 18, wherein the operations further comprise:

determining whether the QFE is needed for the first configuration item; and based on determining the QFE is needed for the first configuration item, receiving the updated first configuration item for displacement of the first configuration item.

20. The one or more computer storage devices of claim 18, wherein the operations further comprise:

determining whether the QFE is needed for the second configuration item;

based on determining the QFE is needed for the second configuration item, halting the deployment;

receiving an updated second configuration item for displacement of the second configuration item;

receiving a second configuration item branch exposure state;

determining, for the second portion of the exposure group, based at least on the second configuration item branch exposure state:

a fifth portion of the exposure group to continue with the second configuration item, and a sixth portion of the exposure group to receive the updated second configuration item; and deploying the updated second configuration item to the sixth portion, in accordance with the second configuration item branch exposure state.

* * * * *